Nov. 30, 1926.

F. M. HESS 1,608,741

APPARATUS FOR EFFECTING CONTINUOUS DISTILLATION

Filed April 29, 1922      3 Sheets-Sheet 1

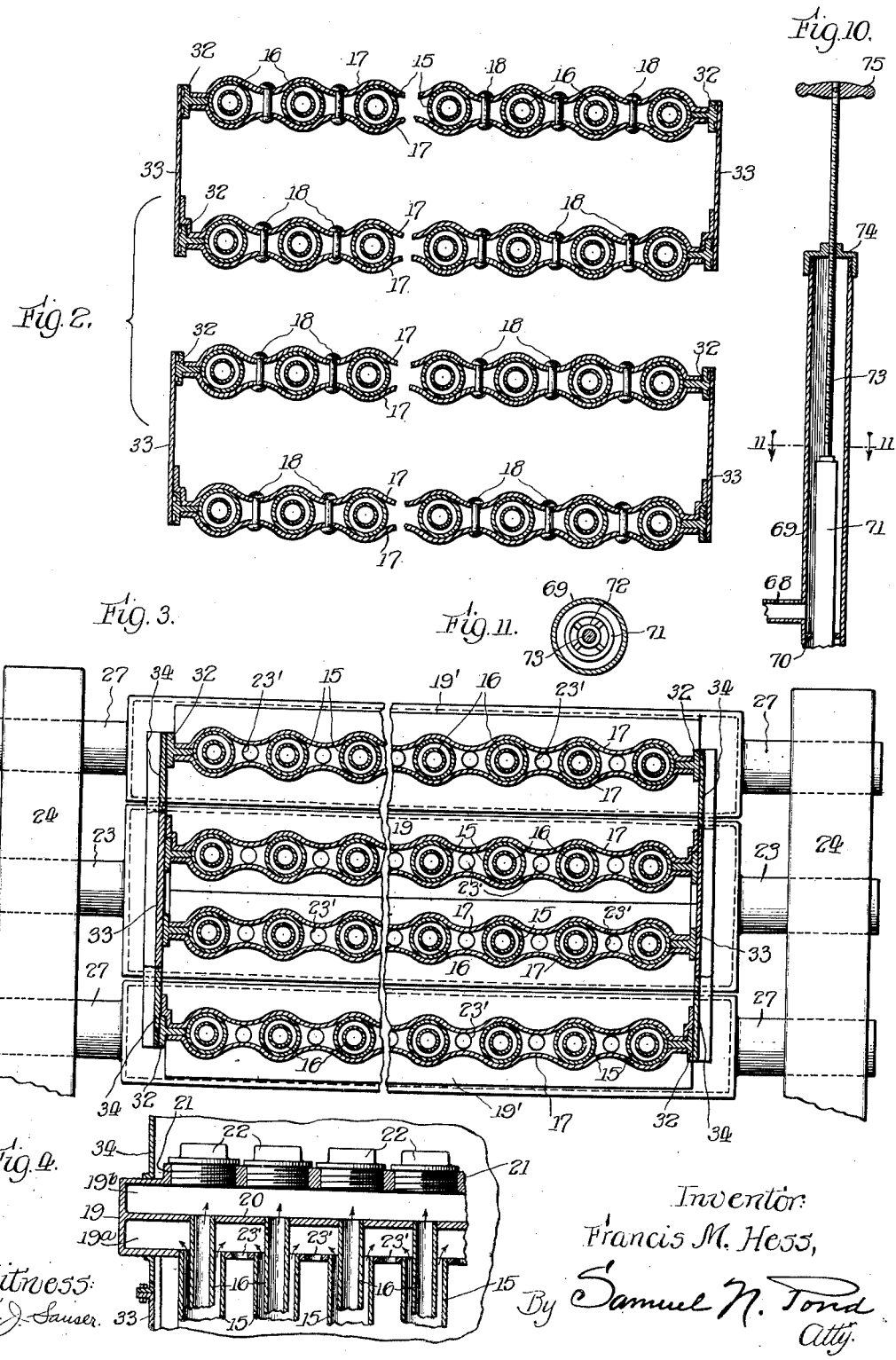

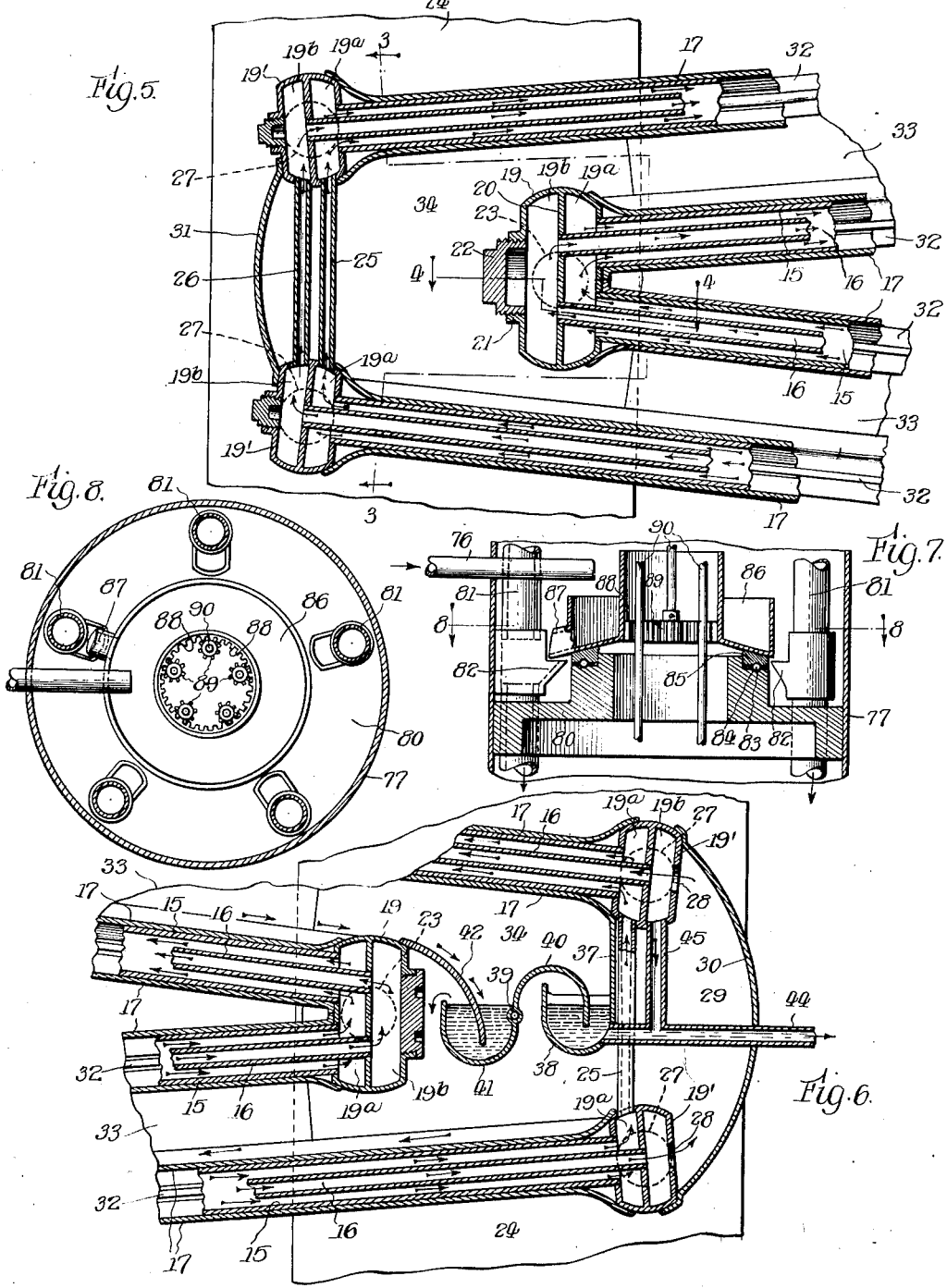

Patented Nov. 30, 1926.

1,608,741

UNITED STATES PATENT OFFICE.

FRANCIS M. HESS, OF WHITING, INDIANA.

APPARATUS FOR EFFECTING CONTINUOUS DISTILLATION.

Application filed April 29, 1922. Serial No. 557,421.

This invention relates to a new and improved apparatus for effecting the continuous distillation of hydrocarbon materials, such as coal tar and petroleum and other distillates; and the present invention is in the nature of an improvement upon the distillation system forming the subject matter of a prior application filed by me on the 29th day of December, 1921, Serial No. 525,597.

In the aforesaid application I have disclosed a gravity system for effecting fractional distillation employing a plurality of separate vapor boxes or stills connected in series and so disposed as to effect a gravity flow of the material in process from the highest to the lowest, and a corresponding series of distillate receivers associated with the respective vapor boxes or stills, the topmost of which is a condenser and heat exchanger, and the remainder of which are heat exchangers. The primary source of heat for the vapor boxes or stills is superheated steam; and an efficient system of heat exchange, with a consequent conservation of heat, is effected by passing the residuum from the bottom of the system upwardly through the walls of the conduits of the several vapor boxes counter-current to the flow of the material in process, and likewise passing the distilled vapor from each vapor box except the uppermost upwardly through the conduit walls of the next superposed vapor box in which it is nearly all condensed, whereby the heat of the residuum and the heat of the vapors are largely transferred to the downflowing material in process.

My present invention retains the same broad principle of heat exchange, and the same broad method of effecting such heat exchange, as in the invention of my aforesaid application; but in the development of the present invention I have had chiefly in view a substantial simplification of the apparatus disclosed in my aforesaid application, in respect of both the distilling means and the condensing and heat exchanging means. In lieu of employing a plurality of separate vapor boxes with pipe and trap connections. I now employ a single large vapor box so organized and constructed as to permit fractional distillation from a plurality of units of which it is composed, the hollow conduit walls of the several units, between which the material in process flows, and through which the superheated steam, residuum, and vapor flow, being continuous from top to bottom of the vapor box, with internal seals or traps between the several units which maintain the fractional distillates from the latter separate and distinct.

Also, in lieu of a plurality of separate and distinct condensers and heat exchangers associated with the several vapor boxes respectively, I now employ a single large multiple unit condenser and heat exchanger so divided as to provide a plurality of sealed chambers connected respectively with the several units of the vapor box. In the complete system a multiple distributor is also employed so constructed as to route the fractions of distillate to any one or more of several lines so as to either maintain all of the fractions separate or effect any desired combination of two or more of the fractions.

The main purpose or object of the invention, briefly stated is to render the entire assembly of the complete system more compact and easier to operate, clean out, control and repair than heretofore, and to materially reduce the operating, repair, and upkeep costs.

Another object of the invention is to provide, in a distillation system of this type, a simplified and improved vapor box or still.

With these objects in view, I have designed the apparatus for effecting continuous fractional distillation forming the subject matter of the present invention; and I will now proceed to give a detailed description of one practical embodiment thereof which, it will be understood may be modified in the matter of details of structure and arrangement by persons skilled in the art without going outside of the principles involved or sacrificing any of the advantages inherent therein.

Referring to the drawings—

Fig. 1 is a view partly in elevation and partly in vertical section illustrating typically the complete distillation apparatus or system.

Fig. 2 is an enlarged cross section through the four heating plates of a single unit of the vapor box, on the line 2—2 of Fig. 1, and illustrating the structural formation of the heating plates;

Fig. 3 is a cross section taken on the offset line 3—3 of Fig. 5, and showing the means for supporting the manifolds or headers which connect adjacent ends of the heating plates;

Fig. 4 is a horizontal section taken on the line 4—4 of Fig. 5;

Fig. 5 is an enlarged vertical section through the heating plates and their headers on the left side of the vapor box;

Fig. 6 is a vertical section enlarged through the heating plates, their headers, and the vapor seal on the right side of the vapor box;

Fig. 7 is an enlarged vertical section through one unit of the distributor;

Fig. 8 is a horizontal section on the line 8—8 of Fig. 7;

Fig. 9 is an enlarged vertical fragmentary section through a portion of the combined condenser and heat exchanger, illustrating a liquid and gas proof joint preferably employed;

Fig. 10 shows in vertical section a leveling device employed between the combined condenser and heat exchanger and the distributor; and Fig. 11 is a cross section on the line 11—11 of Fig. 10.

I will first describe the structural features and organization of the main cooperating elements of the complete system, and their connections; and I will then set forth its mode of operation, from which the manner in which the heat is conserved and utilized through an efficient system of heat exchange will be apparent.

*The vapor box or still.*

My improved vapor box or still comprises a plurality of substantially identical units vertically grouped and continuous with each other so as to permit a continuous gravity flow of the material to be distilled therethrough, and intimately assembled in what may be termed an integral multiple-unit vapor box structure, with internal liquid seals between adjacent units whereby to keep separate the fraction distilled from the several units respectively. This multiple unit vapor box or still is designated as an entirety in Fig. 1 by S, and comprises generally two W-shaped groups (left and right) of hollow heating plates joined at their covergent ends by hollow headers and internested so as to form between adjacent plates of the two groups a continuous zigzag conduit for the gravity flow of the crude material in a broad thin continuous film or stream through the several units. In Fig. 1 I have designated the left hand group as an entirety by L and the right hand group which interfits therewith as an entirety by R. The heating plates of both groups are structurally identical and are best shown in detail in the cross-sectional views, Figs. 2 and 3. In these figures, 15 designates a group of tubes disposed side by side at equally spaced intervals, 16 designates a similar group of smaller tubes disposed coaxially within the larger tubes 15, 17 designates each of a pair of longitudinally corrugated boiler plates which overlie and underlie respectively the tubes 15, and 18 designates rivets uniting the two plates midway between adjacent tubes 15. By this construction is formed a hollow heating plate structure which provides three separate conduits for heating media, namely, the interiors of the smaller tubes 16, the annular conduits between the tubes 16 and 15, and the conduits formed between adjacent tubes 15 and the plate sections spanning adjacent tubes.

Figs. 4 and 5 show one practical means of uniting the convergent ends of each connected pair of heating plates so as to render the internal conduits of said plates continuous. 19 designates a hollow header that extends transversely of the inner convergent ends of the heating plates and is provided with a central longitudinal partition or bridge plate 20 extending from end to end thereof, and is further provided with tapped clean-out holes 21 in its outer wall normally closed by plugs 22. By reference to Fig. 3 it will be observed that the header 19 carries trunnions 23 at its ends which are journaled in suitable frame uprights or posts 24. By reference to Figs. 4 and 5 it will be seen that the outer tubes 15 of the heater plates are fitted into the inner wall of the header 19; while the inner tubes 16 are extended through the inner wall and fitted into the partition wall 20. The outer tubes 15 thus communicate freely with the header chamber 19ᵃ on the inner side of the partition 20, while the inner tubes 16 communicate freely with a chamber 19ᵇ on the outer side of the partition wall. By reference to Figs. 3 and 4 it will also be noted that the inner wall of the header 19 is formed with apertures 23' at points between adjacent tubes 15, thus throwing the heating plate conduit that lies between adjacent tubes 15 also into communication with the inner chamber 19ᵃ of the header.

The outer convergent ends of adjacent heater plates are placed in communication with each other by a generally similar header construction, best illustrated in Figs. 5 and 6, the construction on the left side being shown in Fig. 5, and that on the right side, which is slightly different, being shown in Fig. 6. In both constructions, an individual header 19' extends across and is connected into the tubes 15 and 16 of the two plates. These headers 19' are structurally identical with the header 19 and connected in the same manner to the tubes 15 and 16 of the heater plates; and the inner chambers 19ᵃ are connected by pipes 25, and the outer chambers 19ᵇ of the left hand group are connected by pipes 26. As shown in Fig. 3, the headers 19′ have at their ends trunnions 27, similar to the trunnions 23 of the headers 19, which trunnions 27 are likewise mounted and supported in the upright frames or posts 24. Referring to Fig. 6, showing the header structure (excepting top and bottom) on the right side of the vapor box, the inner chambers 19ᵃ of the headers are connected by the pipe 25, the same as on the left side; but the outer chambers 19ᵇ, instead of being plugged and connected by a pipe, are preferably formed with openings 28 in their outer sides, which openings communicate freely with a chamber 29 formed by a cover plate 30 connecting the outer sides of the two headers, which chamber 29 is also in free communication with the next lower leg of the zigzag conduit, but is sealed from the next upper leg of said conduit by the means hereinafter described.

The communicating headers 19′ on the left side of the vapor box are also connected by a plate 31, generally similar to the cover plate 30, which forms an end wall for the bend of the zigzag conduit. The side walls of this conduit are formed as follows. As shown in Fig. 2, the longitudinal margins of the coverings 17 of the hollow heater plates are secured gas tight to T-bars 32, and to the outer sides of these latter are secured by gas tight joints flat side plates 33, these latter extending between the inner headers 19. The elbow or bend portions of the conduit around the inner headers 19 are closed on their sides by side plates 34 which connect the outer heater plates above and below the header 19 in the same manner as the side plates 33, and form gas tight joints with the plates 33, the headers 19 and 19′, and the end walls 30 and 31.

As shown in Fig. 1, the uppermost two headers of the structure are connected by a curved end wall 35 which closes the upper end of the zigzag conduit through which the material in process flows, and the lowermost two headers of the structure are similarly connected by a curved wall 36 which closes the lower end of the zigzag conduit.

The vapor box or still structure is internally divided into a plurality of units for effecting fractional distillation by a seal structure that permits the direct continuous flow of the material in process through all of the units, but maintains the fractional distillates separate. This seal structure is preferably located in the right hand bends of the flow conduit, as shown in Fig. 1, and is best illustrated as to details of structure in Fig. 6. In the latter figure it will be seen that the lower wall 17 of the topmost heating plate is formed with a depending extension 37 terminating at its lower end in a trough or trap 38 which extends the full width of the conduit. On a spindle 39 mounted in and between the side walls of the conduit inwardly of the trough 38 is an S-shaped member, one limb 40 of which overhangs and enters the trough 38, while the reversely curved limb 41 itself constitutes a sealing trough. To the header 19 is attached an apron 42 which overhangs and enters the trough 41. With both troughs 38 and 41 filled with liquid above the lower edges of the members 40 and 42, the bend of the conduit is manifestly sealed against the backflow of vapor from the lower unit, while the material in process, flowing down the apron 42 fills and overflows the trough 41 and thence continues its flow through the next underlying vapor box unit.

From the upper end of the vapor box, the vapor constituting the first fraction distilled in the topmost unit, together with any uncondensed vapor from the underlying unit or units, passes to the condenser through a pipe 43 (Fig. 1). From the seals 38 pipes 44 extend to the condenser, these pipes, as shown in Fig. 1, being downwardly offset relatively to their point of connection to the condenser sufficiently to maintain the liquid seal in the traps 38; the liquid forming this seal consisting of vapor from a lower unit which, while flowing upwardly through the small inner tubes 16 of the right-hand group of the next higher unit has condensed and returned into the chamber 19ᵇ of the header, whence it flows into the pipe 44 through a connecting pipe 45.

From the bottom of the flow conduit the residuum passes through a pipe 46 (Fig. 1) connected into the wall 36 to a residuum tank 47, whence it is picked up by a pump 48 and forced through a pipe line 49 into the chamber 19ᵇ of the lowermost header 19, flowing thence through the small inner tubes 16 of the left hand group of heating plates, counter-current to the flow of the material in process. From the chamber 19ᵇ of the topmost header 19 the residuum passes by a pipe 50 to any suitable receiving point. Above the vapor box is a leveling tank T, from the bottom of which a pipe 51 extends through the end wall 35 of the topmost unit of the vapor box and delivers the material in process into a wide overflow trough 51′ suspended from the top of the wall 35 and extending the full width of the conduit.

The primary heating agent is a fluid medium, preferably superheated steam; and the same is introduced through a pipe M and branches m (Fig. 1) into the chambers 19ᵃ of the lowermost two headers 19, 19′, whence it flows through the pipes 15 and the conduits between said pipes upwardly through the heater plates of the entire vapor box, passing off through branches m′ and a main discharge pipe M′; the chambers 19ᵃ of the headers 19, together with the pipes 25 connecting the outer series of headers 19', affording passageway for the steam at the bends.

*Combined condenser and heat exchanger.*

Associated with the vapor box and receiving both the uncondensed and condensed fractional distillates from the latter is a combined condenser and heat exchanger shown in Figs. 1 and 9. This structure, which is designated as an entirety by C, comprises a vertical cylinder 52 having top and bottom heads 53 and 54, respectively. The interior of the cylinder is divided into a plurality of chambers by means of transverse partition plates 55. The preferred structure of these partition plates is best illustrated as to detail in Fig. 9, wherein 56 designates a flat flanged ring attached at its outer periphery to the wall of the cylinder 52 and formed on its upper side with an annular groove 57. The partition disc 55 rests upon this ring and, in cases of the upper and lower partition plates, is attached to the latter by stud bolts 58. On the under side of the partition disc 55 is a tongue 59 which fits into the annular groove 57 of the supporting ring, with an interposed packing 60 to form a liquid and gas tight joint. Extending through all of the partition plates and rolled or swaged into liquid and gas tight joints with the apertures of the latter are a series of tubes 61. This structure divides the interior of the cylinder into a group of receiving chambers 62 for the fractions delivered from the units of the vapor box and connected to the latter by pipes 43 and 44, and also upper and lower header spaces or chambers 63 and 64, respectively. A pipe 65 constituting an inflow pipe for the crude material, is connected into the top head or cover 53 and communicates freely with the top header chamber 63; while a pipe 66 leads from the lower header chamber 64 and delivers the crude material from the latter into the gravity tank T. The delivery end of the pipe 66 within the gravity tank is equipped with a float controlled valve 67 or any other equivalent device for maintaining a substantially constant level in the tank T.

Leading off from the lower portion of each of the chambers 62 is a condensate drain pipe 68. For maintaining a predetermined or desired level of the condensate in each of the chambers 62 the drain pipes 68 thereof are each equipped with a leveling device which may take the form illustrated in Figs. 10 and 11, wherein 69 designates a vertical drain pipe section with which the pipe 68 communicates, said pipe 69 extending above the pipe 68 to approximately the top of the associated chamber 62. The pipe 69 is provided with a partition 70, in which is slidably mounted a tube 71 having an open upper end, as shown in Fig. 11, carrying a spider 72, in the hub of which is swiveled the lower end of a screw-threaded rod 73, this latter extending upwardly through and in threaded engagement with a head or cap 74 on the upper end of the pipe 69 and equipped with a hand wheel 75 for turning the same. By raising and lowering the overflow tube 71, the upper open end of the latter establishes the level of the liquid in the chamber 62 in an obvious manner. The leveling device above described is identical with that disclosed in my former application hereinabove identified, and the details thereof form no part of the present invention. On the lower end of each vertical pipe 69 is a horizontal extension 76, by which the liquid condensates from the several chambers of the condenser and heat exchanger C are delivered to a distributor next described.

*The distributor.*

In connection with a fractional distillation system it is highly desirable to be able to route the fractional distillates in any desired manner; either maintaining them entirely separate and distinct, or partially or entirely commingling them, according to the particular quality or qualities of the ultimate product or products desired from the system. In the development and perfection of my present invention, I have accordingly designed a simple, easily manipulated, and effective form of distributor for this purpose, the same being shown as an entirety in Fig. 1, and better illustrated as to structural details in Figs. 7 and 8. This distributor structure, designated as an entirety by D, comprises a vertical cylinder 77 having upper and lower heads or closures 78 and 79, respectively, and equipped internally with a spaced series of centrally apertured bridge plates 80 attached to the cylinder wall. Equally spaced around the inner surface of the cylinder are vertical delivery pipes 81, each of which is provided at points just above the bridge plates 80 with lateral branches or pour openings 82. On each of the bridge plates 80 is an annular trackway 83 preferably carrying anti-friction bearings 84 cooperating with a similar track 85 on the lower side of an annular funnel 86. This latter directly underlies the delivery end of the horizontal pipe 76, which latter is carried into the distributor cylinder through a hole in the latter. The funnel 86 has a delivery spout 87 which, as the funnel is rotated, may be brought into register with the pour opening or mouth 82 of any of the pipes 81. For turning the funnel 86, the latter is preferably equipped with an internal ring gear 88, best shown in Fig. 8, with which engages a pinion 89 fast on the lower end of a vertical rod 90, this latter extending upwardly through the head 78 of the distributor cylinder and equipped with a hand wheel 91 on its upper end for turning the same. The number of rods, pinions and internal gears employed agrees, of course, with the number of distributing funnels in the distributor; five being shown in the present instance.

The operation of the system has, to a considerable extent, already been indicated in connection with the description of its structural features, but may be briefly summarized as follows.

The crude material entering through the pipe 65 is discharged into the top of the combined condenser and heat exchanger C and flows downwardly through the tubes 61 of the latter. In flowing through the tubes 61 it abstracts heat from the uncondensed vapor in the topmost chamber 62, condensing such vapor, and also abstracts heat from the condensed vapors in the remaining chambers 62. Leaving the condenser and heat exchanger through the pipe 66 it flows thence into the gravity tank T, wherein a constant level is maintained by the float-actuated valve 67, thus maintaining a constant gravity head on the material flowing through the vapor box. From the leveling tank the material flows through pipe 51 into the overflow trough 51' and thence, in a wide thin stream it flows downwardly through the continuous zigzag conduit of the vapor box, filling and overflowing the several seal troughs 41 at the junctions of the individual units. During such flow the material in process is subjected to the heat of the superheated steam flowing counter-current through the heating plates of the conduit and also to the heat of the residuum and the vapors, which latter are for the most part condensed in all except the lowermost unit and, flowing backwardly, fill the seal trough 38, and pass thence through the pipes 44 to the chambers 62 of the condenser and heat exchanger. The vapors generated in the topmost unit pass directly through the pipe 43 into the topmost chamber 62 and are therein condensed. It will thus be seen that the heating plates of the vapor box serve a variety of functions, heating the crude material with superheated steam, with the final residuum, and with all the vapors produced (excepting those generated in the topmost unit), keeping the crude material spread out in a broad thin stream to effect uniform and rapid heating, and successively breaking up the stream of crude material as it drops from plate to plate. The material is thus heated in a true and substantially uniform progression, and the vapors are subjected to a dephlegmating effect in traveling the upward circuitous path and are scrubbed and condensed in passing through the inner tubes of the plates of preceding units, thus extracting the heat of vaporization of the vapors and fractionating the vapors into perfect and clean cut fractions.

The leveling devices are easily manipulated to maintain any desired level in the chambers of the condenser and heat exchanger, and from the latter the fractional distillates flow through the several pipes 68, 69 and 76 into the distributor, in which latter, by suitable manipulation of the rotary distributor funnels, the several fractional distillates may all be routed through the respective delivery pipes 81, or any two or more fractions may be combined and sent off through a single delivery pipe, as desired.

The incondensible gases generated in the system are entrained with the vapors and condensates flowing through pipes 43 and 44 to the chambers of the combined condenser and heat exchanger C, and with the condensates flowing from the latter into the distributor D, this action being aided by partial vacuums in the condenser and distributor, and are released through a pipe line Z at the top of the distributor shell 77.

With further reference to the vapor box it will be noted that the two overflow troughs 38 and 41 constitute an effective liquid seal against the upward flow of the vapors generated in any unit into the vapor generating space of the next superposed unit; said vapors being caused to flow through the chamber 29 and the header openings 28 into the inner tubes 16 of the conduit walls of the next superposed unit, so that the vapors are free at all times to travel to the top of the vapor box, if they are not condensed before reaching that point, and no gas traps are created to prevent the free operation of gravity.

I claim—

1. In an apparatus for effecting fractional distillation, the combination of a multiple unit vapor box having a continuous zigzag heating conduit extending from top to bottom thereof for the gravity flow of the crude material and traps in said conduit between adjacent units sealing each unit conduit against the vapor generated in an underlying unit, means for conducting a fluid heating medium through said vapor box counter current to the flow of the crude material and out of contact with the latter, means for conducting the vapor generated in each unit through the next higher unit out of contact with the vapor or vapors generated in the latter, a combined condenser and heat exchanger comprising a series of superposed chambers, a pipe for conveying the uncondensed vapor from the topmost unit of the vapor box to the topmost chamber of the combined condenser and heat exchanger, other pipes for conveying the condensed vapors from the remaining units of the vapor box to the remaining chambers of the combined condenser and heat exchanger, means for conducting the crude material to said combined condenser and heat exchanger, and means for conducting the crude material from said combined condenser and heat exchanger to the top unit of said vapor box.

2. In an apparatus for effecting fractional distillation, the combination of a multiple unit vapor box having a continuous zigzag heating conduit extending from top to bottom thereof for the gravity flow of the crude material and means in said conduit between adjacent units preventing commingling of the fractional distillates, a multiple unit combined condenser and heat exchanger, pipes connecting the units of said vapor box with the respective units of said combined condenser and heat exchanger, means for conducting the crude material to said combined condenser and heat exchanger, and from the latter to the top unit of said vapor box, a distributor for controlling the disposition of the fractional distillates, and pipes connecting the several units of said combined condenser and heat exchanger with said distributor.

3. A vapor box for effecting fractional distillation, comprising a pair of W-shaped groups of heating plates internested to form a continuous zigzag conduit for the gravity flow of the crude material, and a seal interposed across said conduit permitting the downflow of the crude material through the same and sealing said conduit against the counter flow of the vapor distillate through said seal.

4. A vapor box for effecting fractional distillation, comprising a pair of generally W-shaped groups of heating plates internested to form a continuous zigzag conduit for the gravity flow of the crude material, and seals interposed at intervals across said conduit and dividing said vapor box into a plurality of distilling units; said seals permitting the continuous downflow of the crude material through the same and sealing said conduit against the counter flow of the vapor distillate from one unit directly into the conduit of a superposed unit.

5. A vapor box for effecting fractional distillation, comprising a pair of W-shaped groups of hollow heating plates internested to form a continuous zigzag conduit for the gravity flow of the crude material, means for supplying a fluid heating medium to one end of each group and discharging the same from the opposite end, and a trap interposed across said conduit permitting the downflow of the crude material through the same and sealing said conduit against the counter flow of the vapor distillate through the said trap.

6. A vapor box for effecting fractional distillation, comprising a pair of generally W-shaped groups of hollow heating plates internested to form a continuous zigzag conduit for the gravity flow of the crude material, means for supplying a fluid heating medium to the lower end of each group and discharging the same from the upper end, and seals interposed at intervals across said conduit and dividing said vapor box into a plurality of distilling units; said seals permitting the continuous downflow of the crude material through the same and sealing said conduit against the counter flow of the vapor distillate from one unit directly into the conduit of a superposed unit.

7. A vapor box for effecting fractional distillation, comprising a pair of W-shaped groups of heating plates internested to form a continuous zigzag conduit for the gravity flow of the crude material, the heating plates of both groups being formed with internal conduits for the flow of a fluid heating medium therethrough, and the heating plates of one group being formed with additional conduits for the flow of residuum therethrough, headers connecting the convergent ends of said last-named plates and each formed with conduits communicating with and connecting the respective conduits of said plates of said group, means for supplying a fluid heating medium to one end of each group of said plates and discharging the same from the opposite end, means for forcing residuum through the said residuum conduit of one of said groups, and a trap interposed across said crude material conduit permitting the downflow of the crude material through the same and sealing said conduit against the counter flow of the vapor distillate through the said trap.

8. A vapor box for effecting fractional distillation, comprising a pair of W-shaped groups of heating plates internested to form a continuous zigzag conduit for the gravity flow of the crude material, the heating plates of both groups being formed with internal conduits for the flow of a fluid heating medium therethrough, and the heating plates of one group being formed with additional conduits for the flow of vapor therethrough, headers connecting the convergent ends of said last-named plates and each formed with a conduit communicating with and connecting the respective vapor conduits of said plates of said group, means for supplying a fluid heating medium to one end of each group of plates and discharging the same from the opposite end, and a trap interposed across said crude material conduit permitting the downflow of the crude material through the same and sealing said conduit against the counter flow of the vapor distillate through said trap; the vapor conduit of each heating plate communicating freely with the crude material conduit below the trap.

9. A vapor box for effecting fractional distillation, comprising a pair of W-shaped groups of heating plates internested to form a continuous zigzag conduit for the gravity flow of the crude material, the heating plates of both groups being formed with internal conduits for the flow of a fluid heating medium therethrough, the heating plates of one group being formed with additional conduits for the flow of residuum therethrough, and the heating plates of the other group being formed with additional conduits for the flow of vapor therethrough, headers connecting the convergent ends of said last-named plates and each formed with a conduit communicating with and connecting the respective vapor conduits of said plates of said other group, means for supplying a fluid heating medium to one end of each group of plates and discharging the same from the opposite end, a pump for forcing residuum through the said residuum conduit of one of said groups, and a trap interposed across said crude material conduit permitting the down-flow of the crude material through the same and sealing said conduit against the counter flow of the vapor distillate through said trap; the vapor conduit of each heating plate communicating freely with the crude material conduit below the trap.

10. A vapor box for effecting fractional distillation, comprising a pair of W-shaped groups of heating plates internested to form a continuous zigzag conduit for the gravity flow of the crude material, the heating plates of both groups being formed with internal conduits for the flow of a fluid heating medium therethrough, and the heating plates of one group being formed with additional conduits for the flow of vapor therethrough, headers connecting the convergent ends of said last-named plates and each formed with a conduit communicating with and connecting the respective vapor conduits of said plates of said group, means for supplying a fluid heating medium to one end of each group of plates and discharging the same from the opposite end, a pair of traps interposed across said crude material conduit, one of which is sealed by the downflowing crude material and the other by distillate condensed in and flowing backwardly through said vapor conduit, both of said traps sealing said crude material conduit against the counter flow of the vapor distillate through said traps, and a discharge pipe leading from said condensed distillate trap.

11. A heating plate for a vapor box or still and constituting a conduit wall for the downflow of the material undergoing distillation, comprising a pair of thin metal plates, a series of large tubes disposed parallel between and lengthwise of said plates, a corresponding series of smaller tubes disposed within and coaxial with said large tubes, and means for uniting said plates on said large tubes; said large tubes and the spaces bounded by said plates and said large tubes constituting conduits for heating media.

12. A heating plate for a vapor box or still and constituting a conduit wall for the downflow of the material undergoing distillation, comprising a pair of thin longitudinally corrugated metal plates, a series of large tubes disposed parallel between and lengthwise of said plates, a corresponding series of smaller tubes disposed within and coaxial with said large tubes, and rivets uniting said plates on said large tubes; said large tubes and the spaces bounded by said plates and said large tubes constituting conduits for heating media.

FRANCIS M. HESS.